United States Patent [19]

Togawa et al.

[11] Patent Number: 4,581,756
[45] Date of Patent: Apr. 8, 1986

[54] RECOGNITION OF SPEECH OR SPEECH-LIKE SOUNDS USING ASSOCIATIVE MEMORY

[75] Inventors: Fumio Togawa, Nara; Atsuo Tanaka, Nabari, both of Japan

[73] Assignee: Computer Basic Technology Research Association, Tokyo, Japan

[21] Appl. No.: 414,956

[22] Filed: Sep. 3, 1982

[30] Foreign Application Priority Data

Sep. 4, 1981 [JP] Japan .............................. 56-140525

[51] Int. Cl.[4] ............................................. G10L 1/00
[52] U.S. Cl. ................................................... 381/43
[58] Field of Search .................................... 381/41–43

[56] References Cited

U.S. PATENT DOCUMENTS 4,277,644  7/1981  Levinson et al. ...................... 381/43
4,286,115  8/1981  Sakoe .................................... 381/43
4,403,114  9/1983  Sakoe .................................... 381/42

OTHER PUBLICATIONS

Nakano, K., "Associatron-A Model of Associative Memory", IEEE Trans. on Systems, Jul., 1972, pp. 380–388.

Primary Examiner—E. S. Matt Kemeny
Attorney, Agent, or Firm—Birch, Stewart, Kolasch & Birch

[57] ABSTRACT

Spoken words are recognized in a sequence of steps: first finding candidate words in the form of mono-syllabic sequences; then associating (correcting) each mono-syllabic sequence to more speech-like sounds, then comparing with pre-stored dictionary words for final recognition.

2 Claims, 4 Drawing Figures

  
FIG. 1a    $x^1$    $x^2$    $x^3$    FIG. 1c
FIG. 1b
$M =$   +   + 
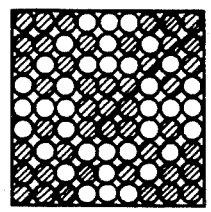
FIG. 2
$Y_A =$   $Z_A =$     $=$ 
FIG. 3a            FIG. 3d
FIG. 3b
$Y_B =$ → $Z_B =$    FIG. 3e
$Y_C =$ → $Z_C =$
FIG. 3c      FIG. 3f

RECOGNITION OF SPEECH OR SPEECH-LIKE SOUNDS USING ASSOCIATIVE MEMORY

BACKGROUND OF THE INVENTION

This invention relates to an improvement in a method of speech recognition and more particularly it relates to a method for perceiving and recognizing speech or speech-like sounds including words or the like inputted thereto.

A conventional way to recognize such sounds as words inputted is to carry out an acoustic process on the introduced sound information representative of the words or the like inputted by acquiring feature vector input patterns for each of the mono-syllables present therein and then checking if matching is present between those input patterns and standard patterns as for mono-syllables. The sound information inputted therein is thereby treated as a train of mono-syllables and compared with a dictionary for speech recognition.

This method however has a certain degree of ambiguousness in comparing the input mono-syllable patterns with the mono-syllable standard patterns. For instance, an entity "SATUKIBARE" (its English meaning is a fine weather in May or rainy seasons) may often be recognized as a train of mono-syllables "SA/TU/KI/PA/RE/" (first candidate) with a resultant decline of accuracy of word recognition. In the event that a greater number of candidates are made available from comparison between the input mono-syllable patterns and the mono-syllable standard patterns and "PA", "TA", "A", "BA" and the like are available as candidates for the fourth mono-syllable, verification of the train of those mono-syllables with the dictionary enriches accuracy of recognition of words or the like to some extent but the time for verification is long and may cause errors in such verification.

OBJECT AND SUMMARY OF THE INVENTION

With the foregoing in mind, it is an object of the present invention to provide a method of speech recognition which enhances accuracy of recognition of words or the like and shortens the time for recognition processes through the use of an associative process relying upon a model of an associative memory device called "Associatron" for verification of words or the like.

In carrying out the above object, the present invention provides a speech recognition method which comprises the steps of effecting an acoustic process on an input speech for acquiring a first train of recognition signals, effecting an associative process using a model of an associative memory called "associatron" on said first train of recognition signals and aquiring a second train of recognition signals through correcting said first train of recognition signals, verifying said second train of recognition signals with a dictionary containing words or the like, whereby words or the like corresponding to the input speech are identified by the results of such verification.

The speech recognition according to the present invention offers significant advantages in enrichment of accuracy of speech recognition and shorter time for recognition processes because the associative process provides an effective measure to correct the train of mono-syllables recognized in the light of the dictionary containing words or the like.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 1(a)–1(c), 2, and 3(a)–3(f) are illustrations for diagrammatically explaining steps of an associative process using a model of an associative memory device called "Associatron"

DETAILED DESCRIPTION OF THE INVENTION

Figure 4:
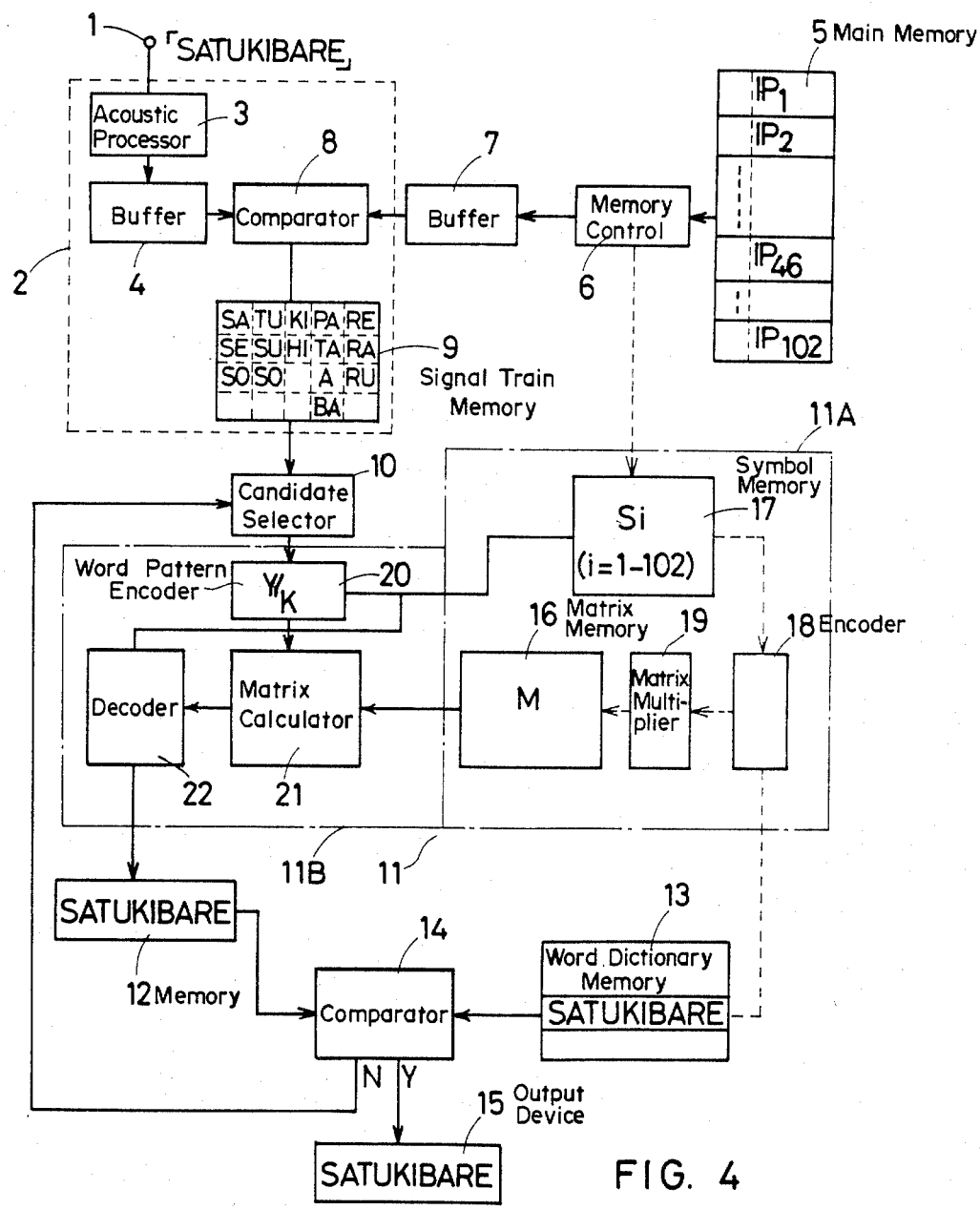
FIG. 4 is a schematic block diagram of a speech recognition system constructed in accordance with an embodiment of the present invention.

Before an embodiment of the present invention will be fully discussed in the following description, a model of an associative memory device for use with a speech recognition system and its operating principle will be explained first.

The model of associative memory device called "Associatron" is an isolated multi-associative memory of the self recalling type and assumes the basic performance that it outputs a memory pattern having the closest correlation for an input pattern having an incompleteness or an ambiguous distortion.

The principle of memorizing and recalling in the model of the associative memory device called an "Associatron" can be represented by five formulas as follows: Note that bold-faced characters denote vectors.

$$\text{pattern, } X_K = (X_{K1}, X_{K2}, \ldots X_{Kl}, \ldots X_{KL})^T \quad (1)$$

$T$:inversion component $X_{Kl}$ assumes three values, 1, 0 and $-1$ $$\text{memory}(K); M = \{m_{ij}\} = \sum_{k=1}^{k} M_K \quad (2)$$

$$M_K = X_K \cdot X_K^T \quad (3)$$

$$\text{recall}; Z = \phi[M \cdot Y] \quad (4)$$

$$\phi[a] = \begin{cases} 1 \text{ if } a > 0 \\ 0 \text{ if } a = 0 \\ -1 \text{ if } a < 0 \end{cases} \quad (5)$$

where Y is the input and Z is the recalling pattern.

It is understood that the pattern $X_K$ as defined in formula (1) is a column vector of a word length L whose component assumes three values, 1, 0 and $-1$. Memorizing is effected in the form of a multi matrix M including a correlation matrix $M_K$ of the pattern $X_K$ pursuant to formulas (2) and (3). In conjunction with the input pattern Y, a recalling pattern is recalled through matrix calculation of the input pattern Y and the memory matrix M as defined by formulas (4) and (5). It should be noted that each of components in the recalling pattern Z is quantized pursuant to formula (5).

A simple example of memorizing and recalling by the model of associative memory device or associatron is given in FIGS. 1 to 3 in which each of components $m_{ij}$ in the memory matrix M is quantized pursuant to formula (5).

FIG. 1 schematically illustrates three patterns $X^1$, $X^2$ and $X^3$ when L=9 and K=3 in the standard pattern X in which the hashed circle denotes "1", the empty circle denotes "−1" and the blank space denotes "0".

The three patterns $X^1$, $X^2$ and $X^3$ shown in FIG. 1 are dealt with by formulas (2) and (3) and stored in the form of a correlation matrix M as shown in FIG. 2. Calculation is executed on input patterns $Y(Y_A, Y_B, Y_C)$ as depicted in FIGS. 3(a) to 3(c) and the memory matrix M with the result that a pattern $Z(Z_A, Z_B, Z_C)$ is recalled as depicted in FIGS. 3(d) to 3(f).

That is, $Z' = M \cdot Y$, $Z = \phi[Z']$ where $\phi[a] = \begin{cases} 1 \text{ if } a > 0 \\ 0 \text{ if } a = 0 \\ -1 \text{ if } a < 0 \end{cases}$ The above process is carried out so as to recall the pattern Z from the input pattern Y.

In connection with the input patterns Y having ambiguousness (typically, $Y_A$ and $Y_B$ are ones having incompleteness and $Y_C$ is a deformed pattern), there is developed a memory pattern with the closest correlation with those input patterns.

According to the present invention, the principle of pattern correction as expected in the model of the associative memory device called "Associatron" and more particularly the performance that corrects deformed patterns is applied to verification with a dictionary for speech recognition. The associative process as described briefly is made available for speech recognition by preparing patterns which give closer correlation to speech-like sounds of higher acoustic resemblance.

FIG. 4 illustrates a detailed description of an embodiment of the present invention. FIG. 4 shows a schematic block diagram in which the associative process relying upon the model of the associative memory device is applied to a dictionary verification section containing mono-syllable sound standard patterns for the purpose of speech recognition. In FIG. 4, a sound signal forming a word unit is applied to an input terminal 1 and is fed to a mono-syllable recognition section 2 of a well-known structure. For example, the sound signal applied to the input terminal 1 is treated by an acoustic processor 3 which in turn effects feature extraction for each of the mono-syllables in the sound signal and loads a feature pattern for each of the mono-syllables into a buffer memory 4 temporarily. A main memory 5, on the other hand, contains a large number of standard patterns $P_i$ (i=1-102) one for each of mono-syllables. These standard patterns are fetched sequentially from a memory control 6 and stored in a second buffer memory 7 temporarily. It is decided is a comparator 8 whether there is matching between the mono-syllable input feature patterns concerning the input sound signal as stored in the buffer memory 4 and the mono-syllable standard feature patterns as in the buffer memory 7. This matching calculation is effected so as to seek the highest resemblance between the two patterns through its repeated execution. The first or closet candidate (the candidate showing the highest resemblance) is selected and followed by the second or succeeding candidates which have lower resemblance, thereby forming a first train of mono-syllable recognition signals to be loaded into a memory 9.

The contents of the memory 9, that is, the first train of mono-syllable recognition signals from the mono-syllable recognition section 2 are transferred via a candidate selector 10 to an associative process section 11 composed of an associative memory 11A and a recall processor 11B. The associative process section 11 corrects the first train of mono-syllable recognition signals and the results of such correction are stored temporarily in a memory 12 as a second train of mono-syllable recognition signals. The second train of the mono-syllable recognition signals is referenced with a word dictionary 13 by means of a comparator 14. If both agree, then the results are outputted via an output device 15 and, if both disagree, the candidate selector 10 is rendered operable to enable the first train of the mono-syllable recognition signals bearing the second highest resembleness to be transferred from the memory 9 to the associative process section 11.

The associative process section 11 has a memory 16 which contains memory matrixes M created in the following manner, based upon the model of the associative memory device called "Associatron," in correspondence with the word dictionary 13. It should be noted that the second train of the mono-syllable recognition signals are recalled from the first with the aid of the memory matrixes M.

The following will set forth a way to create the memory matrixes M. The mono-syllable standard patterns $P_i$ which have been stored in the main memory 5 and fetched via the memory control 6 are converted into symbols $S_i$ (i=1-102) of a word length LS=32 consisting of binary components "1" and "−1" according to the distribution of relative distances or differences between the mono-syllable standard patterns $P_i$. These symbols $S_i$ are thereafter loaded into a symbol memory 17.

Based upon relative distance matrixes $D\{d_{ij}\}$ ($d_{ij}$ is the distance between (i)th mono-syllable and (j)th mono-syllable) of the mono-syllable standard patterns $P_i$, the mono-syllable symbols $S_i$ are encoded as follows into symbols whose word length LS=32 as for each of the mono-syllables. In other words, using the longest distance method groups 102 mono-syllables (/A/ to /N/ and /GA/ to /PYO/) into 31 clusters by utilizing hierarchic clustering and orthogonal symbols of a 32 word length consisting of binary components "1" and "−1" are assigned to each of these clusters. Furthermore, symbols are assigned to each of the mono-syllables in the same cluster, the symbols being on a circumference extending a humming distance diameter of 2 from each of the orthogonal symbols and having a correlative distance of 4 to thereby provide the symbol for the (i)th mono-syllable. By creating the symbol $S_i$ for the mono-syllables in this manner, the correlative distance or the humming distance among the symbols falling in the same cluster is 4, whereas the humming distance among the symbols in the different clusters is at least 12.

The hierarchic clustering is a way to define the distance d([X,Y], Z) between a category X, Y having the minimum distance in (j)th class and another category Z as follows when incorporating into the same cluster:

$$d([X, Y], Z) = \max(d(X, Y), d(y, z)) \tag{7}$$

The humming or correlation distance is the distance $d_H$ between two symbols a; $(a_1, a_2, \ldots a_n)$, b; $(b_1, b_2, \ldots b_n)$ is specified below:

$$d_H = \sum_{i=1}^{n} C_i, \quad C_i = \begin{cases} 0 \text{ if } a_i = b_i \\ 1 \text{ if } a_i \neq b_i \end{cases} \tag{8}$$

An encoder 18 in the associative memory 11A converts the contents of the word dictionary 13 into word patterns correlated with the symbols $S_i$, thus creating the word patterns $X_K$ correlated with the symbols $S_j$. Assuming now that the maximum number of mono-syllables in words stored in the word dictionary 13 N=5, the word patterns $X_K$ can be defined as follows:

$$X_K = \{A_1, A_2, \ldots A_n, \ldots A_N, \overline{A}_1, \overline{A}_2, \ldots \overline{A}_n, \ldots \overline{A}_N\}^T \quad (6)$$

where $A_n$ denotes the mono-syllable symbol for (n)th syllable and $\overline{A}_n$ denotes the inversion of $A_n$. It is however to be noted that blank syllables consist of components "0". The word patterns $X_K$ are represented in terms of column vectors of a word length L=LS N 2=320 having the same frequency of components "1" and "−1."

Having been converted into the word patterns $X_K$ in the foregoing manner through the encoder 18, the words in the dictionary are fed to a correlation calculator/matrix multiplexer 19 which in turn executes a selfcorrelation calculation as defined by formula (3) and multiplexes correlative matrixes corresponding to each of the words pursuant to formula (2) to thereby create the memory matrixes M. The resulting memory matrixes M are stored as word information in the memory 16.

The recall processor 11B within the associative process section 11 converts the train of the mono-syllable recognition signals from the mono-syllable recognition section 2 including the acoustic processor 3 into the input word patterns Y correlated with the symbols $S_j$ through an encoder 20. A matrix calculator 21 executes matrix calculation on the input word patterns Y and the memory matrices M in the memory 16 pursuant to formulas (4) and (5) and recalls word patterns Z after correction thereof. A decoder 22 converts the recalled word patterns into a train of mono-syllable signals having the same code system as that of the information stored in the word dictionary 13 and then provides a train of recalled mono-syllables (the second train of mono-syllables) which are thereafter retained temporarily in the memory 12. Dictionary reference is conducted between the train of the recalled mono-syllables as stored in the memory 12 and the contents of the word dictionary 13 through the comparator 14 and, if there is agreement, the results thereof are outputted through the output device 15.

Speech recognition tests with the above described system determined that the ratio of rejection of incorrectly recognized words was much improved due to the present invention featuring the associative process. More particularly, the tests were conducted using three male speakers who each pronounced 50 difficult to read Kanji(Chinese characters) words (the maximum number of mono-syllables was 5 and the average thereof was 3.2) in the form of isolated mono-syllables ten times each within 2 sec and thus a total of 1500 word samples. The results of these speech recognition tests are indicated in Table 2 where each one of the following steps was taken in conjunction with mono-syllable candidates derived from a mono-syllable recognition method as defined in Table 1:

(I) Dictionary reference or verification is carried out on only with the first candidate of each of mono-syllables;

(II) Dictionary verification is carried out on trains of mono-syllables sequentially in the ranking of candidates; and (III) Dictionary verification, combined with the associative process featured by the present invention, is carried out.

TABLE 1

| Mono-syllable recognition method | |
| --- | --- |
| Quantization: | 16 KHz sampling 12 bits |
| Feature: | up to 24th Cepstrum coefficients 16 frames |
| Matching: | using a Kalman filter |
| Registration: | 102 mono-syllables × 2 times |

TABLE 2

| | Results of speech-like word recognition accuracy (%) (error %) | | |
| --- | --- | --- | --- |
| | Method | | |
| Speaker | I | II | III |
| A | 32.0 | 67.6 | 92.6(4.2) |
| B | 51.4 | 92.0 | 98.2(0.4) |
| C | 52.6 | 87.0 | 96.4(1.4) |
| Average | 45.3 | 82.2 | 95.7(2.0) |

The results shown in Table 2 reveal that the use of method (II) caused a 36.9% improvement of rejection ratio on the average as compared with the method (I) and the method of the present invention caused a 13.5% improvement as compared with the method (II). That is, the method of the present invention (the method III) achieves remarkable improvements in the rejection ratio and recognition speed over the conventional methods because for instance, in the event that the first candidate of the mono-syllables "SA" "TU" "KI" "PA" "RE" is developed as the results of mono-syllable recognition in connection with the sound input "satukibare," the associative process of the present invention makes it possible to recall "SATUKIBARE" as stored in the word dictionary 13.

It should be noted that the trains of mono-syllable candidates in the methods (II) and (III) were selected in the increasing order of the sum of verification distance $q_{mn}$ (verification distance of (m)th candidate for (n)th mono-syllable) for recognition of mono-syllables:

$$\min \left\{ \sum_{n=1}^{N_0} q_{mn}, \; N_0: \text{number of syllables} \right\} \quad (9)$$

The model of the associative memory device used with the present invention is of a multiplex memory type which is liable to blur its contents with an increase in vocabulary and therefore has a limited capacity. The features of the associative memory are that it may perform memory and associative processes from one subject to another as long as a small number of sound standard patterns are registered in the system and, furthermore, it may enrich its correction performance thanks to optimum encoding based upon the distribution of distances of mono-syllables and demonstrate its usefulness for recognition of speech of a larger vocabulary.

Whereas the associative process is applied to the dictionary verification section in recognizing the words in the light of the mono-syllable standard patterns in the above illustrated embodiment of the present invention, it is obvious to those skilled in the art that the associative process is equally applicable to dictionary verification for recognition of words using phonetic standard patterns. The memory matrixes M may be structured in a hierarchic system. It is further possible that the associative process may be effected on a sentence-by-sentence basis or a subject-by-subject basis.

What is claimed is:

1. A method of recognition of multi-syllable aural speech comprising:

recognizing individual syllabic sounds of a monitored word in said multi-syllable speech;

extracting features from each said individual syllabic sound to develop a monitored feature pattern representative thereof;

comparing each said monitored feature pattern with each of a plurality of standard feature patterns and determining each standard feature pattern which is a close correlation therewith, said standard feature patterns being representative of known syllabic sounds;

assembling the closest correlative standard feature patterns representative of a word choice to individual syllables into a train of mono-syllable recognition signals;

correcting said train of mono-syllable recognition signals utilizing associative processing;

searching a word dictionary memory having reference words and their associated reference trains of mono-syllable recognition signals and comparing each said reference train with said corrected train of mono-syllable recognition signals to recognize and output said associated word upon coincidence thereof to identify said monitored word;

repeating, when said steps of searching and comparing fails to determine a coincidence, said steps of assembling, correcting, searching and comparing with the next closest of said close correlating standard feature patterns;

said step of correcting comprising;

developing a reference memory matrix M representative of each word in said word dictionary memory, said reference memory matrix being constructed of matrix elements representative of standard feature patterns representing the individual syllabic sounds used to pronounce said word, said matrix elements representing standard feature patterns having a relative difference to other said matrix elements corresponding to the aural difference between the individual syllabic sounds represented thereby, developing a word choice memory matrix Y representative of said word choice, said word choice memory matrix being constructed of said matrix elements representative of the individual syllabic sounds of said word choice; and producing said corrected train of mono-syllable recognition signals as a function of M·Y.

2. A speech recognition system for recognizing multi-syllable aural speech comprising:

means for recognizing individual syllabic sounds of a monitored word in said multi-syllable speech;

means, responsive to said means for recognizing, for extracting features from each said individual syllabic sound to develop a monitored feature pattern representative thereof;

feature memory means for storing the representations of a plurality of syllabic sounds and their associated standard feature patterns;

comparison means, responsive to said feature memory means and means for extracting, for comparing each said monitored feature pattern with each standard feature pattern stored in said feature memory means and determining which of said syllabic sounds stored in said feature memory means is a close correlation to each said individual syllabic sound represented by said monitored feature pattern;

means, responsive to said comparison means, for assembling the closest correlating standard feature patterns to represent a word choice of individual syllabic sounds into a train of mono-syllable recognition signals;

means, responsive to said means for assembling, for associatively processing said train of mono-syllable recognition signals to correct said train;

word dictionary memory means for storing words to be recognized and their associated reference trains of mono-syllable recognition signals;

means, responsive to said means for associatively processing, for searching said reference trains and comparing them to said corrected train of mono-syllable recognition signals to recognize and output said associated word upon coincidence thereof to identify said monitored word;

said means for associatively processing comprising;

first means, responsive to said feature memory means and word dictionary memory means, for developing a reference memory matrix M representative of each word in said word dictionary memory means, said reference memory matrix being constructed of matrix elements representative of standard feature patterns representing the individual syllabic sounds of said word, said matrix elements representing standard feature patterns having a relative difference to other said matrix elements corresponding to the aural difference between the individual syllabic sounds represented thereby, second means, responsive to said means for assembling, for developing a word choice memory matrix Y representative of said word choice, said word choice memory matrix being constructed of said matrix elements representative of the individual syllabic sounds of said word choice, and means, responsive to said first and second means for developing, for producing said corrected train of mono-syllable recognition signals as a function of M·Y.

* * * * *